US011329953B2

(12) United States Patent
Atad et al.

(10) Patent No.: US 11,329,953 B2
(45) Date of Patent: May 10, 2022

(54) SYSTEM AND METHOD FOR PROVIDING CYBER SECURITY TO AN IN-VEHICLE NETWORK

(71) Applicant: Argus Cyber Security Ltd, Tel Aviv (IL)

(72) Inventors: Matan Atad, Tel Aviv (IL); Shiran Ezra, Ramat Gan (IL); Gilad Barzilay, Ganei Tikva (IL); Yaron Galula, Kadima (IL)

(73) Assignee: Argus Cyber Security Ltd., Tel Aviv (IL)

( * ) Notice: Subject to any disclaimer, the term of this patent is extended or adjusted under 35 U.S.C. 154(b) by 313 days.

(21) Appl. No.: 15/915,251

(22) Filed: Mar. 8, 2018

(65) Prior Publication Data

US 2018/0262466 A1 Sep. 13, 2018

Related U.S. Application Data

(60) Provisional application No. 62/468,984, filed on Mar. 9, 2017.

(51) Int. Cl.
*H04L 29/06* (2006.01)
*H04L 67/12* (2022.01)
(Continued)

(52) U.S. Cl.
CPC .......... *H04L 63/0209* (2013.01); *H04L 43/00* (2013.01); *H04L 63/0245* (2013.01); *H04L 63/0263* (2013.01); *H04L 63/1416* (2013.01); *H04L 63/1425* (2013.01); *H04L 63/1441* (2013.01); *H04L 67/12* (2013.01); *H04L 69/22* (2013.01); *H04W 76/12* (2018.02); *H04W 76/15* (2018.02); *H04W 76/16* (2018.02);
(Continued)

(58) Field of Classification Search
CPC . H04L 63/0209; H04L 43/00; H04L 63/0245; H04L 63/0263; H04L 63/1416; H04L 63/1425; H04L 63/1441; H04L 67/12; H04L 69/22; H04W 76/12; H04W 76/15; H04W 17/16
See application file for complete search history.

(56) References Cited

U.S. PATENT DOCUMENTS 9,794,275 B1 * 10/2017 Benameur ........... H04L 63/1416
2006/0256730 A1    11/2006 Compton
(Continued)

OTHER PUBLICATIONS

Muter et al. "A structure approach to anomaly detection for in-vehicle networks" Information Assurance and Security, 2010 Sixth International Confernce, IEEE, Aug. 23, 2010, p. 93-97.
(Continued)

*Primary Examiner* — Tongoc Tran
(74) *Attorney, Agent, or Firm* — Pearl Cohen Zedek Latzer Baratz LLP (57) ABSTRACT

A system and method securing an in-vehicle network in a vehicle may include a switch connected to at least two segments of the in-vehicle network and an IDPS connected to the switch. The IDPS unit may be adapted to: receive network messages from the switch; determine at least some of the network messages are related to a cyber threat and configure the switch according to the cyber threat. The IDPS unit may be included in the switch.

20 Claims, 4 Drawing Sheets

(51) Int. Cl.
  *H04L 43/00*  (2022.01)
  *H04W 76/16*  (2018.01)
  *H04W 76/12*  (2018.01)
  *H04L 69/22*  (2022.01)
  *H04W 76/15*  (2018.01)
  *H04W 76/18*  (2018.01)
  *H04W 76/19*  (2018.01)
  *H04L 43/04*  (2022.01)

(52) U.S. Cl.
  CPC ............ *H04L 43/04* (2013.01); *H04W 76/18* (2018.02); *H04W 76/19* (2018.02)

(56) References Cited

U.S. PATENT DOCUMENTS

| | | | | |
|---|---|---|---|---|
| 2012/0054866 | A1* | 3/2012 | Evans | H04L 63/1416 726/23 |
| 2015/0020152 | A1 | 1/2015 | Litichever et al. | |
| 2015/0127790 | A1* | 5/2015 | Smith | H04L 41/0816 709/221 |
| 2015/0271201 | A1* | 9/2015 | Ruvio | H04L 63/1408 726/23 |
| 2016/0088001 | A1 | 3/2016 | Yeh et al. | |
| 2017/0200323 | A1* | 7/2017 | Allouche | G07C 5/008 |
| 2017/0230385 | A1* | 8/2017 | Ruvio | G06F 21/552 |
| 2017/0346790 | A1* | 11/2017 | Duda | H04L 63/0263 |
| 2018/0115575 | A1* | 4/2018 | Hartkopp | H04L 12/40 |
| 2018/0189483 | A1* | 7/2018 | Litichever | H04L 69/22 |
| 2018/0205703 | A1* | 7/2018 | Grau | G06F 21/554 |
| 2018/0316699 | A1* | 11/2018 | David | G06F 21/552 |
| 2019/0132246 | A1* | 5/2019 | Kumar T C | H04L 67/32 |

OTHER PUBLICATIONS

European Search Report of EP Application No. ep 18 16 0802 dated May 28, 2018.

* cited by examiner

SYSTEM AND METHOD FOR PROVIDING CYBER SECURITY TO AN IN-VEHICLE NETWORK

CROSS-REFERENCE TO RELATED APPLICATIONS

This application claims the benefit of U.S. Provisional Patent Application No. 62/468,984, entitled "SYSTEM AND METHOD FOR CYBER SECURITY PROTECTION FOR AUTOMOTIVE ETHERNET", filed on Mar. 9, 2017, which is incorporated herein by reference in its entirety.

FIELD OF THE INVENTION

The present invention relates generally to protecting an in-vehicle network. In particular, the invention enables protecting an in-vehicle network from cyber-attacks.

BACKGROUND OF THE INVENTION

The automotive industry has, initially slowly, and subsequently with great rapidity, been evolving from using mechanical control systems that control a vehicle's functions to electronic "drive by wire" control systems for controlling the vehicle's functions. In mechanical vehicular control systems, the driver of a vehicle controls components of a vehicle that control vehicle functions by operating mechanical systems that directly couple the driver to the components via mechanical linkages. In drive by wire vehicle control systems, a driver may be coupled directly, and/or very often indirectly, to vehicle control components that control vehicle functions by electronic control systems and electronic wire and/or wireless communication channels, rather than by direct mechanical linkages. The driver controls the control components by generating electronic signals that are input to the communication channels and to the electronic control systems.

Typically, a vehicular electronic control system includes a user interface for receiving driver actions intended to control a vehicle function, transducers that convert the actions to electronic control signals, and a plurality of sensors and/or actuators that generate signals relevant to the function. In other cases, electronic control systems and sensors are used in, or for, autonomous cars (e.g., driverless cars, self-driving cars, robotic cars and the like) as known in the art. An electronic control unit (ECU) of the control system receives user generated signals and/or signals generated by the sensors, other ECUs and/or actuators, and, responsive to the signals, operates to control a vehicle component involved in performing the function. The ECU of a given control system may also receive and process signals relevant to performance of the function generated by, and/or by components in, other vehicle control systems. The sensors, actuators, and/or other control systems communicate with each other and with the ECU of the given control system via a shared in-vehicle communication network, to cooperate in carrying out the function of the given control system. Messages sent over an in-vehicle network as described herein may include signals and/or signal values.

In-vehicle communication networks of modern vehicles are typically required to support communications for a relatively large and increasing number of electronic control systems of varying degrees of criticality to the safe and efficient operation of the vehicles. A modern vehicle may, for example, be home to as many as seventy or more control system ECUs that communicate with each other and with sensors and actuators that monitor and control vehicle functions via the in-vehicle network. The ECUs may, by way of example, be used to control, in addition to engine throttle described above, power steering, transmission, antilock braking (ABS), airbag operation, cruise control, power windows, doors, and mirror adjustment.

The growing multiplicity of electronic control systems, sensors, actuators, ECUs and communication interfaces and ports that an in-vehicle communication network supports makes the in-vehicle communication network, and the vehicle components that communicate via the communication system, increasingly vulnerable to attempts (e.g., by hackers) to damage, destroy, or interfere with an operation of, an in-vehicle network, node or system (e.g., cyber-attacks as known in the art) that may dangerously compromise vehicle safety and performance In addition, the growing complexity of electronic control systems in vehicles makes it harder than before to identify and/or detect faults or malfunctions of, or related to, components and networks included in a vehicle.

Ethernet, a local area network (LAN) technology, is known in the art. The introduction of Ethernet technologies into vehicle networks, fueled by the growing demand for bandwidth by advanced applications, is increasing the abundance of cybersecurity challenges and risks to the automotive world.

SUMMARY OF THE INVENTION

An embodiment for securing an in-vehicle network in a vehicle may include a switch connected to at least two segments of the in-vehicle network and an intrusion detection and prevention system (IDPS) connected to the switch. The IDPS unit may be adapted to: receive network messages from the switch; determine at least some of the network messages are related to a cyber threat; and configure the switch according to the cyber threat. The IDPS unit may be included in the switch.

The IDPS unit may be adapted to perform deep packet analysis of the network messages. Determining at least some of the network messages are related to a cyber threat may be based on a state and context of at least one of: the vehicle, the in-vehicle network and at least one component connected to the in-vehicle network. The switch may include a ternary content-addressable memory (TCAM) table, and the step of configuring the switch, by the IDPS unit, may include updating information in the TCAM table.

The IDPS unit may be adapted to: determine that the cyber threat is no longer present; and reconfigure the switch according to a post cyber threat state. The IDPS unit may be adapted to generate and update a model of network traffic over the in-vehicle network; and identify a cyber threat based on relating network messages received from the switch to the model.

An embodiment may include at least one sensor adapted to identify events related to at least one of: the in-vehicle network, the vehicle and at least one unit connected to the in-vehicle network; and the IDPS unit may identify a cyber threat based on a report received from the sensor. The IDPS unit may generate and update a model of network traffic over the in-vehicle network based on information received from the sensor; and use the model to identify a cyber threat. Other aspects and/or advantages of the present invention are described herein.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that, for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

In the description of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable the embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments include different features, not all of which are required in all embodiments. Some embodiments utilize only some of the features or possible combinations of the features. Variations of embodiments of the invention that are described, and embodiments including different combinations of features noted in the described embodiments, will occur to a person having ordinary skill in the art.

Unless explicitly stated, the method embodiments described herein are not constrained to a particular order in time or chronological sequence. Additionally, some of the described method elements may be skipped, or they may be repeated, during a sequence of operations of a method. While certain features of the invention have been illustrated and described herein, many modifications, substitutions, changes, and equivalents may occur to those skilled in the art. Various embodiments have been presented. Each of these embodiments may of course include features from other embodiments presented, and embodiments not specifically described may include various features described herein.

Figure 1:
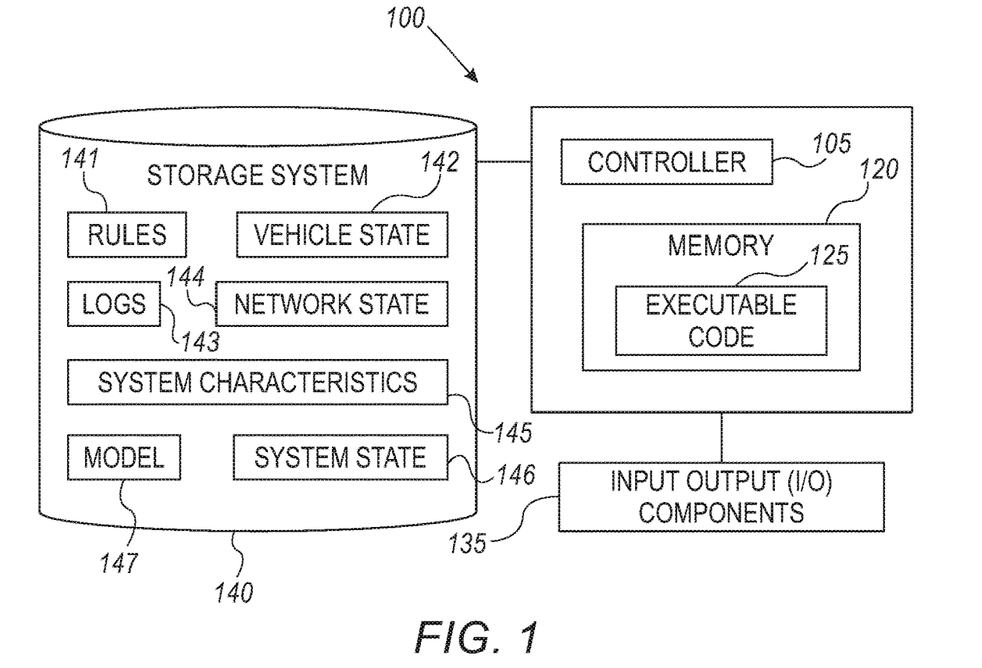
FIG. 1 shows a block diagram of a computing device according to illustrative embodiments of the present invention.

Reference is made to FIG. 1, showing a non-limiting, block diagram of a computing device or system 100 that may be used for cyber security protection for automotive ethernet or other network according to some embodiments of the present invention. For example, computing device or system 100 may be included in one or more IDPS units connected to an in-vehicle network as further described herein. Computing device 100 may include a controller 105 that may be a hardware controller. For example, a computer hardware processor or hardware controller 105 may be, or may include, a central processing unit processor (CPU), a chip or any suitable computing or computational device. Computing system 100 may include a memory 120, executable code 125, a storage system 140 and input/output (I/O) components 135. Controller 105 (or one or more controllers or processors, possibly across multiple units or devices) may be configured (e.g., by executing software or code) to carry out methods described herein, and/or to execute or act as the various modules, units, etc., for example by executing software or by using dedicated circuitry. More than one computing device 100 may be included in, and one or more computing devices 100 may be, or act as the components of, a system according to some embodiments of the invention.

Memory 120 may be a hardware memory. For example, memory 120 may be, or may include machine-readable media for storing software e.g., a Random-Access Memory (RAM), a read only memory (ROM), a memory chip, a Flash memory, a volatile and/or non-volatile memory or other suitable memory units or storage units. Memory 120 may be or may include a plurality of, possibly different memory units. Memory 120 may be a computer or processor non-transitory readable medium, or a computer non-transitory storage medium, e.g., a RAM. Some embodiments may include a non-transitory storage medium having stored thereon instructions which when executed cause the processor to carry out methods disclosed herein.

Executable code 125 may be an application, a program, a process, task or script. A program, application or software as referred to herein may be any type of instructions, e.g., firmware, middleware, microcode, hardware description language etc. that, when executed by one or more hardware processors or controllers 105, cause a processing system or device (e.g., an IDPS) to perform the various functions described herein.

Executable code 125 may be executed by controller 105, possibly under control of an operating system. For example, executable code 125 may be an application that provides or enforces security in a vehicle as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein, e.g., an IDPS as described herein, may be, or may include, controller 105, memory 120 and executable code 125.

Storage system 140 may be or may include, for example, a memory chip, a hard disk drive, a universal serial bus (USB) device or other suitable removable and/or fixed storage unit. As shown, storage system 140 may include rules 141, vehicle state 142, logs 143, network state 144, system characteristics 145, system state 146 and model 147. Where applicable, rules 141, logs 143 and/or system characteristics 145 are collectively referred to hereinafter as rules 141, logs 143, and/or system characteristics 145 or individually as rule 141, log 143 and/or system characteristic 145, merely for simplicity purposes.

Rules 141, vehicle state 142, logs 143, network state 144, system characteristics 145, system state 146 and model 147 may be, may be stored in or may be represented by any suitable digital data structure or construct or computer data objects that enables storing, retrieving and modifying values. For example, rules 141, vehicle state 142, logs 143, network state 144, system characteristics 145, system state 146 and model 147 may be files, tables or lists in a database in storage system 140, and may each include a number of fields that can be set or cleared, a plurality of parameters for which values can be set, a plurality of entries that may be modified, and so on. For example, a vehicle's state may be set, cleared or modified in a vehicle state 142 by modifying digital data in a vehicle state 142 digital object.

Content may be loaded from storage system 140 into memory 120 where it may be processed by controller 105. For example, a value indicating or representing a vehicle's state (e.g., stationary, engine is running, speed at which the vehicle is moving) may be loaded from vehicle state 142 into memory 120 and used, by controller 105, for selecting and/or applying a rule, identifying a cyber-threat, performing an action and so on as further described herein.

In some embodiments, some of the components shown in FIG. 1 may be omitted. For example, memory 120 may be a non-volatile memory (e.g., a flash memory) having the storage capacity of storage system 140. Accordingly, although shown as a separate component, storage system 140 may be embedded or included in system 100, e.g., in memory 120.

I/O components 135 may be, may be used for connecting (e.g., via included ports) or they may include any suitable output devices. For example, I/O components 135 may be, may be used for connecting, a wired or wireless network interface card (NIC), a universal serial bus (USB) device or an external hard drive.

A system according to some embodiments of the invention may include components such as, but not limited to, a plurality of central processing units (CPU) or any other suitable multi-purpose or specific processors, controllers, microprocessors, microcontrollers, field programmable gate arrays (FPGAs), programmable logic devices (PLDs) or application-specific integrated circuits (ASIC). A system according to some embodiments of the invention may include a plurality of input units, a plurality of output units, a plurality of memory units, and a plurality of storage units. A system may additionally include other suitable hardware components and/or software components.

Where applicable, modules or units described herein, may be similar to, or may include components of device 100 described herein. For example, an IDPS as described herein may be or may include a controller 105, memory 120 and executable code 125.

Some embodiments include one or more IDPS units or systems that may be included in a vehicle, e.g., connected to an in-vehicle Ethernet or other network. An IDPS unit may be, or may include, a cyber security protection layer for automotive ethernet or other networks that detects cyber-attacks and prevents them from affecting the vehicle by applying deep packet inspection (DPI) technologies and context aware filters on different layers of the network communication.

While securing the attack surface from attacks is crucial, it is well-known that eventually the first line of defense may be breached. For that purpose, an in-depth security approach is implemented by some embodiments to detect and prevent an attacker attempting to broaden his campaign from the attack surface penetrated to additional vehicle services and functionalities.

The term "attack surface" as used to herein may relate to one or more elements through which an attacker gains access to a system. Otherwise described, an attack surface includes components that are typically the first elements in a system accessed or attacked by an attacker. For example, an ECU that includes a wireless interface through which an attacker can gain access to an in-vehicle network is, or is part of, an attack surface.

Trying to affect other vehicle controls using their preliminary access, attackers will typically use the network communication between ECUs by spoofing or manipulating network traffic in order to influence the vehicle behavior. Therefore, some embodiments may enforce separation (Domain Separation) between secure and insecure network segments to minimize the potential effect of a breach. A network segment may be a physical or logical part of a network. For example, the wire and nodes connected to a first port of a switch may be a first network segment and the wire and nodes connected to a second port of the switch may be a second network segment. A network segment may be, or may be defined, logically. For example, a virtual local area network (VLAN) as known in the art can be viewed and used as network segments. Network nodes such as gateways and switches use segments to control flow of data in a network, for example, a gateway or switch can be configured to forward packets from a firs segment to a second segment, prevent packets from reaching a segment and so on.

If the nature of the network is not dynamic, some embodiments may use static network configuration and enforce use-case based switching rules, e.g., enforce per use-case data flows. To successfully detect and block packet fabrication attacks, some embodiments may perform stateful DPI on automotive applications and diagnostics services. This inspection may be context and vehicle condition aware to maximize its capacity to detect injections of otherwise legitimate packets.

Some embodiments may detect exploitation of vulnerabilities and design flaws in used protocols, for example, some embodiments may protect against vulnerabilities and attacks related to any one of the Transmission Control Protocol/Internet Protocol (TCP/IP), Scalable Service-Oriented Middleware over IP (SOME/IP), Diagnostics over Internet Protocol (DoIP) and Audio Video Bridging over Ethernet (AVB) protocol stacks. Some embodiments may protect a vehicle's network against Denial of Service (DoS) attacks, e.g., identify and contain DoS attacks to minimize their impact on safety critical applications.

Some embodiments may update security policy over the air, e.g., in some embodiments, security solution may be adaptive, allowing "virtual patching" of new vulnerabilities as they are released. Some embodiments may detect and log suspected attacks that may have bypassed some preventative security measures. Once detected, these bypass events may be aggregated across a fleet on a centralized off board server in order to analyze, understand and prepare the proper response.

Some embodiments may include a security layer inside an in-vehicle Ethernet network. In some embodiments, Ethernet packets may be passed through a set of security filters, and these filters may be implemented using an Ethernet switch's ternary content-addressable memory (TCAM) table or a TCAM table in a Gateway. As known in the art, a TCAM is a specialized type of high-speed memory that searches its entire contents in a single clock cycle.

In some embodiments, packets matching the security filters may be sent to a security layer or unit for further analysis. If a message is classified as anomalous, suspected or malicious, it may be logged and may be blocked, according to a configuration of a system. A log of suspected and malicious events may be sent to a central management server for analysis.

In some embodiments, e.g., to increase speed of operation and/or save resources, only some of the packets communicated over an in-vehicle network may be examined. For example, an embodiment may use statistical filters for selecting which of the packets are to be examined or analyzed. Any rules or criteria may be used for selecting packets or messages for examination or inspection. For example, the first five or ten packets or messages for each new session may be examined and thereafter, messages in the session may be statistically selected, e.g., an embodiment may examine 65% of the messages in a session, or examine several messages every five milliseconds and so on.

A session as referred to herein may be, for example, a TCP/IP connection or channel established between nodes connected to an in-vehicle network, or it may be any other communication channel established between nodes according to any protocol. Packets or messages statistically or otherwise selected for inspection may be sent to a security layer or unit (e.g., in an IDPS as described herein) for further analysis. Any metadata or information related to packets may be examined. For example, a timestamp representing the time a message was sent or received, the rate, frequency or number of packets per time unit, the average size of packets, the largest or smallest packet size seen and so on may all be collected or determined (e.g., by a sensor or by an IDPS) and included in metadata as described, and the metadata may be sent and/or used for further analysis aimed at identifying a cyber threat.

The term "cyber threat" as used herein may be related to any security threat, e.g., a cyber-attack as known in the art. A cyber threat may be, or may include, an event or situation wherein software installed by a hacker is being executed by an ECU (that may be referred to herein as a compromised ECU). For example, a cyber threat may be identified based on the presence of anomalous or suspicious packets on an in-vehicle network, e.g., packets injected to the network by an attacker who, for example, gained control of an ECU or otherwise managed to gain access to the in-vehicle network, e.g., via a wireless connection.

Figure 2:
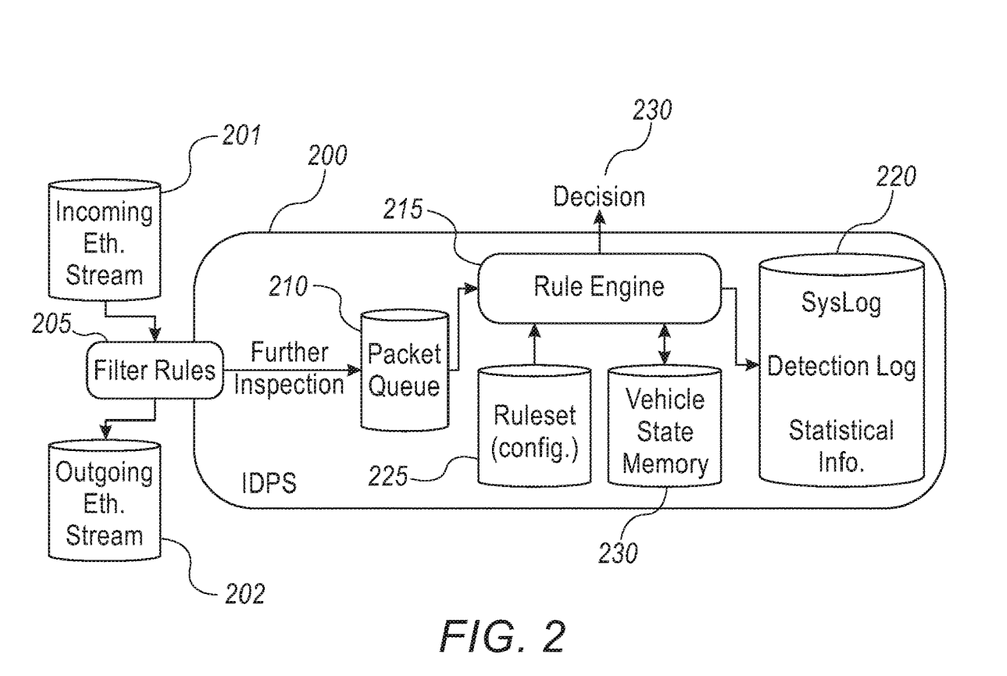
FIG. 2 shows a block diagram of a system and flows according to illustrative embodiments of the present invention.

Reference is made to FIG. 2 which shows components of an IDPS 200 system according to some embodiments of the invention. As shown, an incoming stream of messages 201 may be provided to a filter rules unit 205 in IDPS 200. An output or outgoing stream of messages 202 may be sent, from IDPS 200 to an in-vehicle network. Outgoing stream 202 may include messages that were received in incoming stream 201, e.g., messages that were found to be legitimate or non-related to a cyber-threat and may be returned to the in-vehicle network untouched or as received. Outgoing stream 202 may include messages that were generated by IDPS 200, e.g., in response to a cyber-attack, IDPS 200 may generate messages, e.g., IDPS 200 may generate messages commanding ECUs to shut down or perform other operations, IDPS 200 may generate messages disabling a portion of an in-vehicle network, IDPS 200 may generate messages designed to configure a gateway and so on. Filter rules unit 205 may determine that some of the input messages 201 need further inspection, and, in such a case, filter rules unit 205 may pass the messages to packet queue 210 wherefrom messages may be extracted for further processing by rule engine unit 215.

To process messages, rule engine unit 215 may use rulesets 225, vehicle state memory 230 and data in storage 220 such as logs and statistical information as shown. A decision 230 may be produced by IDPS 200. For example, a decision 230 may be that a specific packet or message is anomalous and/or related to a cyber threat, e.g., injected into an in-vehicle network by malicious code in an infected ECU.

In some embodiments, filter rules 205 may include a whitelist of allowed packets as well as a blacklist of blocked packets. Filter rules 205 may be based on any one of: the payload (metadata and content) of packets, current state of the vehicle (for example its speed) and/or the state of the system.

A rule mechanism may include and/or enable detection of complex events such as the frequency of packets, logical operations between different criteria, and more. This flexibility enables embodiments of the invention to provide or generate an immediate response to new threats as they are detected through simple updates. The described mechanism that includes filters and other components shown in FIG. 2 also enables support for complex scenarios, which might be required in emergencies or for activating some functionality from remote.

An embodiment, e.g., IDPS 200, may include a detection mechanism for detecting anomalous network packets or messages. For example, IDPS 200 may detect anomalous Ethernet packets (e.g., packets suspected of being part of a cyber-attack) by performing DPI and stateful analysis that compares packets to a model (e.g., model 147) or to a ruleset (e.g., ruleset 225) built for the in-vehicle network.

In some embodiments, models (e.g., model 147) or rulesets (e.g., ruleset 225) may be automatically built based on extensive research and understanding of the system logic behind in-vehicle traffic. In some embodiments, a model or rule set (e.g., model 147 or ruleset 225) may include several detection layers. For example, model 147 or ruleset 225 may include a network specification enforcement layer or unit that may be designed and adapted to ensure that packets seen on the network are in accordance with a network's use-case specification. For example, this layer may include enforcing rules, criteria or other logic on gateway ports, VLAN, media access control (MAC) addresses, IP addresses, layer 4 (L4) ports and allowed application identifiers, e.g., a network layer may include rules related to SOME/IP service discovery, DoIP initiation and termination and the like.

In some embodiments, model 147 or ruleset 255 may include a protocol protection layer or unit that may identify anomalies and/or look for exploitations of known vulnerabilities in layer 2 (L2) and layer 3 (L3) network protocols, for example, by exploiting a race condition in SOME/IP Service Discovery in order to hijack a message-id and replace the legitimate ECU as its provider, or invalidate an AVB stream.

In some embodiments, model 147 or ruleset 225 may include an automotive application protection layer, unit or module that may identify, detect and/or characterize anomalies in the payload, timing and context of automotive application packets.

For example, an automotive application protection layer module or unit in IDPS 200 may include a signal content analysis detection unit or layer that may analyze, identify, detect and/or characterize network traffic based on physical properties of the data carried by the automotive application level signals. A signal content analysis layer or unit in IDPS 200 may be designed to detect, identify and/or characterize irrational "behavior" by reading the signal's values. Examples of an anomalous reading would be a signal that unexpectedly transitions to a dramatically different value or a reading outside of the defined range.

An automotive application protection layer, module or unit in IDPS 200 may include an AVB packets timing analysis unit or layer that may be adapted to analyze, identify, detect and/or characterize AVB packets timing. This may include, for example, checking frame frequency against what would be expected.

An automotive application protection layer or unit in IDPS 200 may include a context aware analysis unit or layer that may detect, identify and/or characterize threats by correlating between different packets sent on the network. An automotive application protection layer or unit in IDPS 200 may include a diagnostic analysis unit or layer that may analyze, identify, detect and/or characterize DoIP sessions, e.g., identify attacks like Brute Force on Security Access and operations invalid in the given Vehicle Condition (for example, detect a Programming Session while the vehicle isn't stationary).

A model, e.g., model 147, may include a Denial of Service protection unit or layer that may identify, detect and/or characterize and block DoS attacks on TCP/IP, like TCP-SYN and UDP fragmented floods. A Denial of Service protection unit or layer in IDPS 200 may identify, detect and/or characterize and block DoS attacks on automotive application, like DoIP ECU Reset flood, AVB packet flood and the like.

IDPS 200 may include a prevention layer, mechanism or unit. Once anomalous packets are detected, and based on the risk and confidence attributed to it, IDPS 200 may use different techniques in order to prevent the attack. For example, IDPS 200 may prevent packet forwarding, for example, in deployments in which an embodiment can control or influence an Ethernet switch forwarding decisions an embodiment may cause the switch to drop or discard anomalous packets by, for example, including rules or signatures in a TCAM included in the switch. As referred to in the art and herein, a signature in a TCAM is generally a pattern that may be matched with a pattern when searching the TCAM for the pattern, accordingly, a signature in a TCAM may be similar to, or used as a rule or criteria in a search operation.

Figure 3:
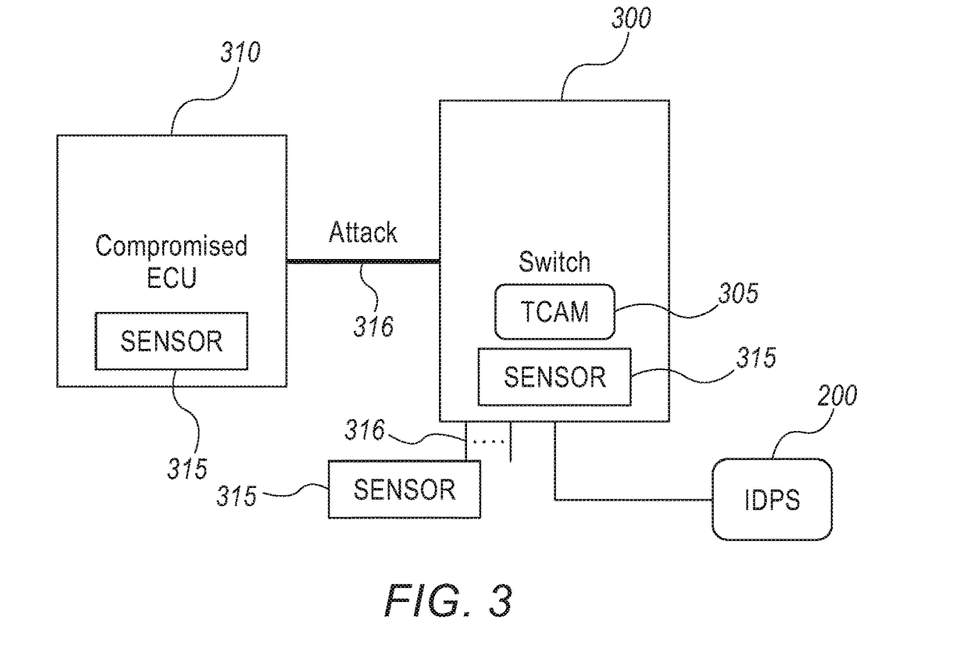
FIG. 3 shows a block diagram of a system and flows according to illustrative embodiments of the present invention.

Reference is made to FIG. 3, which illustrates control of a switch by an IDPS unit according to some embodiments of the invention. As shown, a compromised ECU 310 that may be an ECU over which an attacker gained control may send packets to switch 300 that processes packets based on TCAM 305. For example, switch 300 may include components of computing device 100 described herein and may process packets, e.g., using a controller 105, memory 120 and executable code 125. Switch 300 may be connected to several network segments, for example, via respective ports in switch 300. Accordingly, switch 300 may be adapted to control flow of network packets between network segments. For example, upon or after identifying or determining that an ECU has been compromised (e.g., it is controlled by malicious software), switch 300 may, based on a configuration applied by IDPS 200 as further described herein, isolate the network segment that includes the compromised ECU from the rest of the network. For example, in order to isolate a network segment, switch 300 blocks the flow of packets to/from the network segment.

IDPS 200 may be connected to switch 300 and may receive some or even all packets received by switch 300.

Although, for the sake of clarity and simplicity, a single ECU 310 is shown in FIG. 3, it will be understood that many ECUs may be (and typically are) connected to switch 300, and, accordingly, IDPS 200 may receive packets originating from many ECUs. For example, a sniffer port in switch 300 may be used to send some, or even all, packets received by switch 300. Accordingly, IDPS 200 may be able to inspect any packet received by switch 300. As further shown, a system may include one or more sensors 315 that may be adapted to identify events related to at least one of: an in-vehicle network, the vehicle and at least one unit connected to the in-vehicle network. Sensors 315 may be adapted to report events to IDPS 200, and IDPS 200 may be adapted to identify a cyber threat based on a report received from one or more of sensors 315. As shown, sensors 315, ECU 310 and switch 300 may be connected to an in-vehicle network 316. In-vehicle network 316 may be any suitable network or communication bus installed in a vehicle and enabling components such as ECUs, switches and sensors to communicate.

Figure 4:
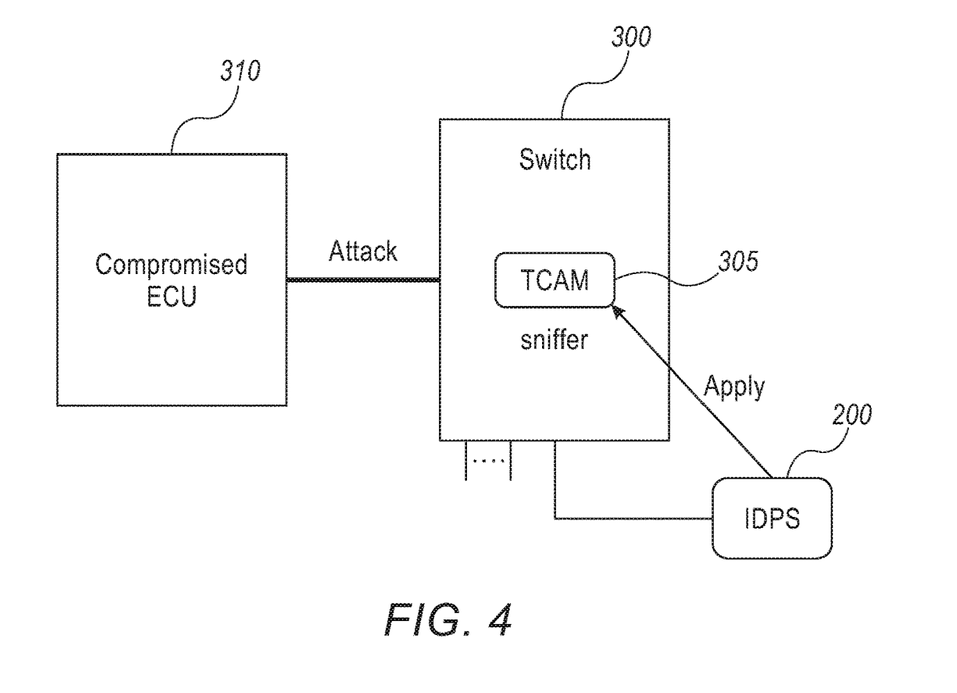
FIG. 4 shows a block diagram of a system and flows according to illustrative embodiments of the present invention.

Reference is additionally made to FIG. 4, which illustrates control of a switch by an IDPS unit according to some embodiments of the invention. As shown, upon identifying a cyber-threat, IDPS 200 may apply a rule to TCAM 305 thus effectively control processing of packets by switch 300. For example, having determined that ECU 310 has been compromised (e.g., it is controlled by code injected thereto by a hacker), IDPS 200 may update TCAM 305 to include a rule or filter that causes switch 300 to drop or block packets coming from ECU 310.

Figure 5:
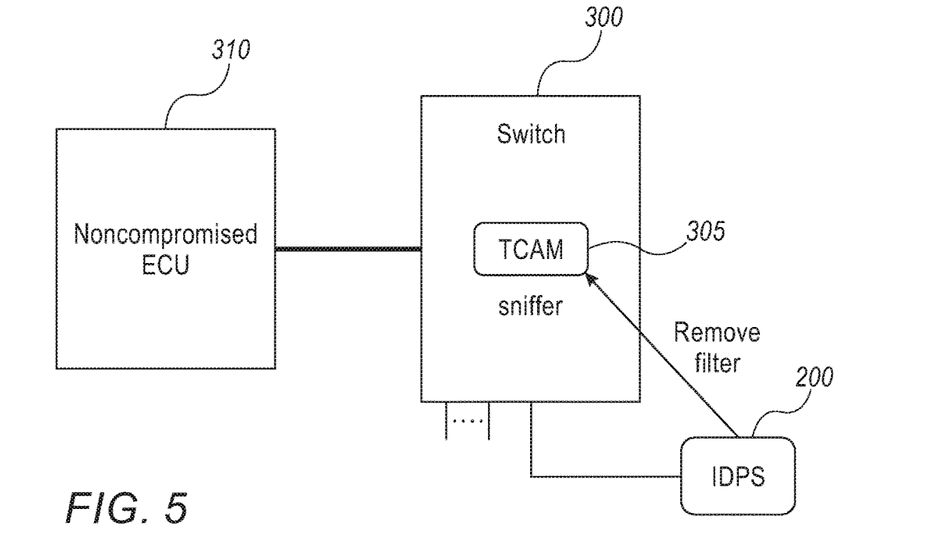
FIG. 5 shows a block diagram of a system and flows according to illustrative embodiments of the present invention.

Reference is additionally made to FIG. 5, which illustrates control of a switch by an IDPS unit according to some embodiments of the invention. As shown, upon, when or after IDPS 200 identifies or determines that a cyber-threat is over, IDPS 200 may remove a filter included in TCAM 305 as shown by FIG. 4, thus, for example, causing switch 300 to stop dropping packets coming from ECU 310 that may no longer be compromised as shown.

As shown by FIGS. 3, 4 and 5 and described herein, an embodiment may apply signatures or rules using a switch's TCAM. For example, IDPS 200 may examine, evaluate or analyze packets forwarded from switch 300, and may configure switch 300 to confine or restrict a cyber-attack in, or to, a specific network segment by applying rules or signatures to TCAM 305, in real-time. Generally, switch 300 may match received packets with signature or rules in TCAM 305 and select an operation (e.g., drop, block, forward and so on) based on a match with a signature or rule. For example, a rule or signature written to TCAM 305, by IDPS 200, may cause switch 300 to prevent packets coming from ECU 310 from being forwarded to (or otherwise reaching) a specific segment in an in-vehicle network. For example, some of the ports of switch 300 may be connected to a sensitive part of an in-vehicle network (e.g., segments connected to ECUs that control the brakes) while other ports of switch 300 may be connected to non-sensitive portions of the network, e.g., segments that connect an infotainment unit. If it is determined, or even suspected, that ECU 310 has been compromised, IDPS 200 may configure switch 300, by updating rules in TCAM 305, such that traffic originating at ECU 310 does not reach the sensitive portions, segment or parts of the in-vehicle network, e.g., while packets from ECU 310 may be allowed to reach an infotainment unit, they may be prevented from reaching ECUs that control the engine, brakes or air bags. Accordingly, an embodiment may selectively block or prevent flows of packets from compromised ECUs or from ECUs suspected to be compromised. When or after IDPS 200 determines or identifies an attack is over, e.g., ECU 310 is no longer controlled by malicious code, IDPS 200 may remove a filter or otherwise configure or reconfigure TCAM 305, thus restoring normal operation of a system as well as freeing resources related to TCAM 305.

An embodiment may prevent malicious packet generation. For example, IDPS 200 may be included, embedded or deployed in a network endpoint (e.g., an ECU), and IDPS 200 may monitor, intercept or identify malicious packets before they are sent from, or received by, the ECU. If the endpoint or ECU is compromised, an embedded IDPS unit may prevent generation of packets by the compromised ECU, and/or an embedded IDPS unit may prevent the compromised ECU from sending and/or receiving a malicious packet and/or an embedded IDPS unit may prevent an ECU from processing a malicious packet. An embedded IDPS unit may block packets, forward suspicious packets to a predefined destination or trap or quarantine packets for further analysis in the local or in a remote IDPS unit.

Various deployments of units may be contemplated. For example, depending, among other considerations, on resources available, a number of deployment schemes of IDPS or other units may be used.

Figure 6:
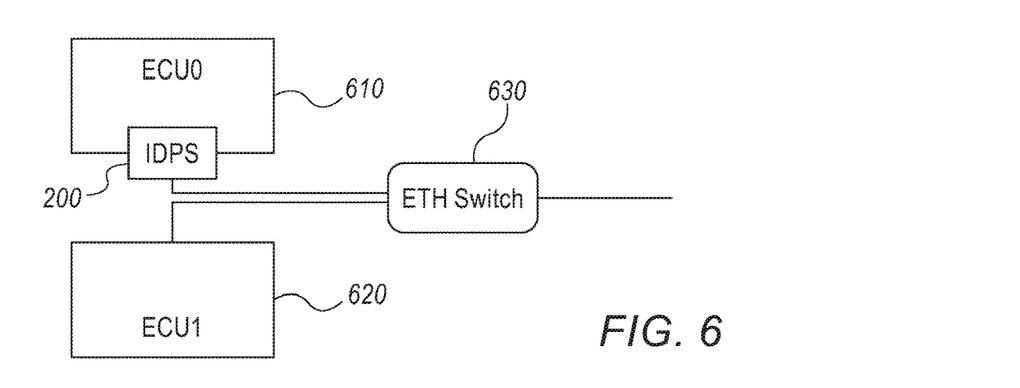
FIG. 6 shows a block diagram of a system and flows according to illustrative embodiments of the present invention.

Reference is made to FIG. 6, which illustrates embedding IDPS 200 in an ECU 610. As illustrated by FIG. 6, in order to provide low resource consumption, endpoint deployment may be used, including deploying, including or embedding an IDPS 200 in an ECU 610 (e.g., a safety critical or high-risk ECU that is an attack surface), and the embedded IDPS 200 may monitor, process and block traffic (both incoming and outgoing) between the ECU 610 and a switch 630 or other network components.

For example, in the configuration shown in FIG. 6, IDPS 200 may detect and prevent anomalous traffic from affecting endpoint ECU 610, and, e.g., by applying sandboxing, IDPS 200 may prevent the compromised ECU 610 that is an attack surface from affecting the rest of the system. As shown, IDPS 200 may be embedded in some ECUs, for example, ECU 620 does not include an IDPS unit, for example, ECU 620 may be a low-risk ECU or ECU 620 may be protected by an IDPS in switch 630 (not shown).

Figure 7:
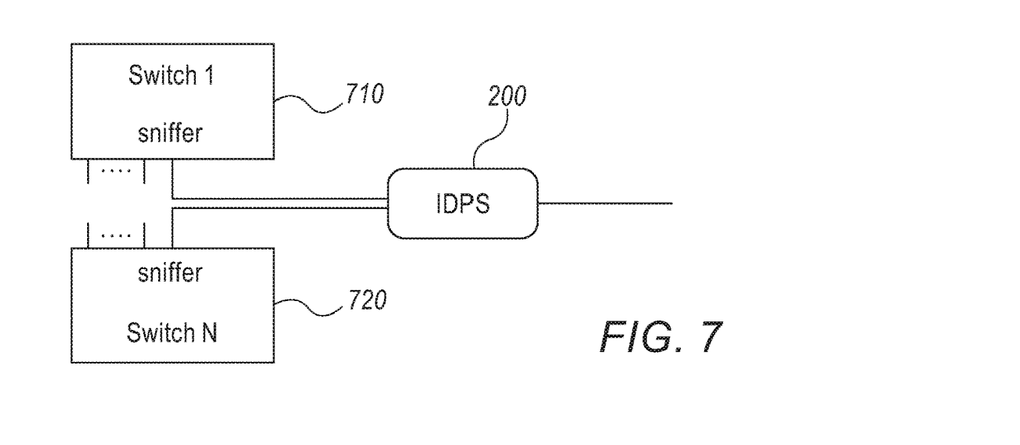
FIG. 7 shows a block diagram of a system and flows according to illustrative embodiments of the present invention.

Reference is made to FIG. 7, which illustrates a centrally located or deployed IDPS 200 according to some embodiments of the invention. As shown, IDPS 200 may be connected to ECUs 710 and 720 and perform operations as described for a plurality of ECUs. Accordingly, in some embodiments, an IDPS unit may be centrally located or deployed. For example, as illustrated by FIG. 7, full traffic monitoring or sniffing may be done for all connected ECUs, e.g., if high resource consumption is available. For example, if resources are not an issue, the IDPS unit may be deployed at a point to which all switches in a system or network are forwarding traffic. For example, sniffer ports on switches in a network may forward all switch traffic to IDPS 200 as shown by FIG. 7. IDPS 200 may process packets received from switches as described herein and may interact with the switches, e.g., include rules in switches' TCAMs as described.

It is noted that, when centrally located or deployed as illustrated by FIG. 7 and described herein, an IDPS unit may be privy to all Ethernet or other traffic in a vehicle's network and may thus provide optimal protection and/or decisions based on all traffic in an in-vehicle network.

Figure 8:
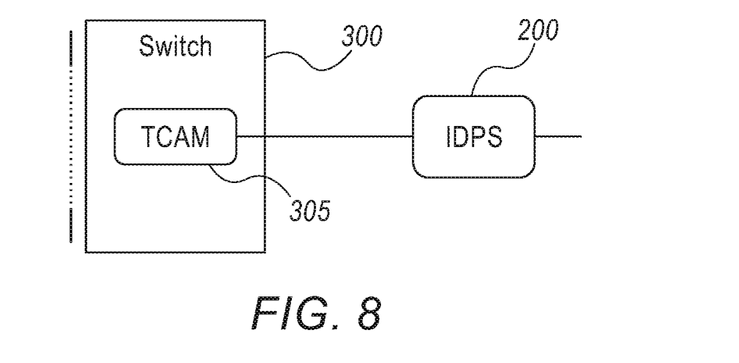
FIG. 8 shows a block diagram of a system and flows according to illustrative embodiments of the present invention.

Reference is made to FIG. 8, which illustrates a distributed deployment of IDPS units according to some embodiments of the invention. In some embodiments, a distributed deployment may be used or implemented, e.g., functionalities may be distributed over or between a switch and a gateway. For example, as shown by FIG. 8, the IDPS unit may be deployed in a distributed manner, where part of the logic (for example whitelisting) takes place in a switch, and a default route leads to the IDPS for anomalous traffic detection. For example, the whitelist may also have functional entries that will route traffic to the gateway, as part of its functional operating scheme.

As illustrated by FIG. 8, TCAM 305 in switch 300 may be programmed to forward packets to segments behind the gateway and may be further programmed or configured to enforce rules on Ethernet or other frames' metadata such that suspicious packets are forwarded directly (and possibly only) to IDPS 200 for further analysis. As described, metadata of a message may be, or may include, any information related to a message, e.g., a size of the message, a time the message was sent or received, a source and destination and so on. Generally, metadata of or for a message or packet, as referred to herein, may be, or may include, any data or information other than the payload of the message or packet. If a general-purpose processor is available in the switch, then, in some embodiments, TCAM 305 may forward anomalous messages to that processor, which in turn may preprocess messages or packets before deciding whether or not to forward them to the gateway.

Figure 9:
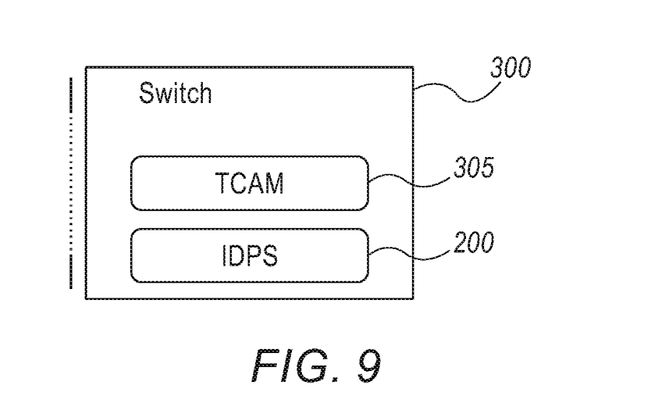
FIG. 9 shows a block diagram of a system according to illustrative embodiments of the present invention.

Reference is made to FIG. 9, which illustrates embedding an IDPS 200 in a switch 300 according to some embodiments of the invention. In some embodiments and as illustrated by FIG. 9, if a general-purpose processor is available in the switch and it is capable of supporting IDPS logic then logic of an IDPS unit may be executed by the switch itself, e.g., by a general-purpose processor or co-processor of the switch. Accordingly, nominal resource consumption may be achieved by some embodiments.

In the use case illustrated by FIG. 9, TCAM 305 may mark for inspection the anomalous traffic for IDPS 200, and IDPS 200 may analyze and log attacks utilizing in-switch general purpose hardware, e.g., a co-processor or any other computational component. For example, in the use case shown in FIG. 9, IDPS 200 may be able and/or adapted to block specific packets forwarding and not only detect and log attacks.

Some embodiments may provide cross fleet monitoring. For example, a monitoring system that includes several Ethernet IDPS units may enable or provide cross fleet monitoring schemes. Such monitoring scheme may allow an OEM or a fleet manager to have a high-level overview of what is the current and historical cyber security health status of the fleet as a whole as well as have an "early warning system" that can help address security incidents as they develop.

For example, information collected from a monitoring system that includes a plurality of IDPS units as described deployed in a respective plurality of vehicles may be uploaded to a central server, aggregation unit or analysis center, where the information may be processed across the fleet. Thus, an embodiment may include or provide the ability to investigate specific events across a fleet of different vehicles as well as the ability to have actionable insights in order to be able to properly respond to events as they unfold. Any information or data may be uploaded from a plurality of IDPS or other units, e.g., logs collected in a vehicle as described, warnings, events and the like.

In some embodiments, a system for securing an in-vehicle network in a vehicle includes a switch connected to at least two segments of the in-vehicle network and an IDPS unit connected to the switch, the IDPS unit is adapted to receive network messages from the switch, determine at least some of the network messages are related to a cyber threat, and configure the switch according to the cyber threat. For example, IDPS 200 may be connected to switch 300 as described, may receive network messages from switch 300 and may configure switch 300 by modifying entries in TCAM 305 as described. In some embodiments, the IDPS unit is included or embedded in the switch. For example, as shown by FIG. 9, IDPS 200 may be embedded or included in switch 300. To include or include IDPS 200 in switch 300, a single component or element that is adapted to perform the operations and logic of switch 300 and of IDPS 200 may be provided. When included or embedded in switch 300, IDPS 200 may receive packets from switch 300 over an internal bus or via a shared memory as known in the art.

In some embodiments, an IDPS unit is adapted to perform deep packet analysis of network messages and determine at least some of the network messages are related to a cyber threat based on a state and context of at least one of: the vehicle, the in-vehicle network and at least one component connected to the in-vehicle network. For example, IDPS 200 may perform deep packet analysis of network messages and determine at least some of the network messages are related to a cyber threat based on a state of the vehicle as included in vehicle state 142 and/or based on network state as included in network state 144 and/or based on a system state as included in system state 146. IDPS 200 may update vehicle state 142, network state 144 and system state 146 based on messages as described. For example, upon being informed, by an ECU controlling the engine, that the engine was started, IDPS 200 may update vehicle state 142 to include or reflect that the state of the vehicle (that may have been "idle" or "off") is now "operational" or "running".

Context and/or state of any one of a vehicle, an in-vehicle network and/or a component connected to the in-vehicle network as referred to herein may relate to a state of the vehicle, a state of the vehicle's in-vehicle communication network and/or a state of nodes connected to an in-vehicle communication network. For example, a state or context a vehicle may be defined (and determined or identified, e.g., by IDPS 200) responsive to values received from one or more sensors or nodes connected to an in-vehicle network.

Accordingly, the context and/or state of a vehicle, an in-vehicle network and/or components in the vehicle may be known to IDPS 200. For example, by communicating with an engine control unit, or by examining messages sent by the unit, IDPS 200 may know if the engine is running (a first vehicle context), if the engine is turned off (a second, different vehicle context) and so on.

Values reported to, or obtained by, IDPS 200, such as: vehicle's speed, acceleration, closing speed to a leading or trailing vehicle, engine revolutions per minute (rpm), engine temperature, oil pressure, hydraulic pressure, wheel traction, road condition, vehicle location optionally provided by a GPS signal, and/or weather condition may all be used, by IDPS 200, to determine a state or context of one or more of: the vehicle, the in-vehicle network and components connected to the in-vehicle network.

A context or state of a node may be, for example, an operational stage or phase, e.g., the node is rebooting, the node is in an initialization stage, the node is restarting and so on. A context or state of a node may be related to an error that occurred at the node or network or any other aspect related to the functioning of the node or network. Accordingly, IDPS 200 may determine, detect or identify a context based on at least one of: a state or other attribute of a vehicle, an in-vehicle network, and a node connected to the network.

For example, by examining messages communicated over an in-vehicle network IDPS 200 may know, or determine or identify, the state of the vehicle itself, nodes on the in-vehicle network as well as the state or context of any one of the nodes connected to an in-vehicle network.

IDPS 200 may receive data from components in a vehicle and calculate, determine or deduce a context, possibly based on more than one input from more than one component. For example, a first context may be determined by IDPS 200 if the speed of the vehicle is 40 mph and the rpm is 1,500 and a second, different context may be determined by IDPS 200 if the speed of the vehicle is 10 mph and the rpm is 1,500. A context may be determined, IDPS 200, based on a lookup table as known in the art, e.g., a table that associates a set of states of, or signals received from one or more of: of a vehicle, an in-vehicle network and nodes on the in-vehicle network with a state. Accordingly, any set of states and/or set of conditions and/or set of signals received may be translated to, or used for determining, a context and/or state as described.

Performing deep packet analysis of network messages and determining that some of the network messages are related to a cyber threat based on a state and context may include applying different processing for different contexts or states. For example, IDPS 200 may search for specific values in messages when the vehicle is in a first state and search for other, different values, in messages, when the vehicle is in a second, different state. For example, IDPS 200 may perform deep packet analysis of messages arriving from an engine control unit in a first state or context (e.g., the vehicle is in motion and/or the engine is running) but, when the vehicle is nor moving, IDPS may ignore messages coming from an ECU related to the braking system. Accordingly, an embodiment may selectively process messages based on a state and context as described.

In some embodiments, a switch configured by an IDPS unit includes a TCAM table and configuring the switch, by the IDPS unit, includes updating information in the TCAM table. For example, IDPS 200 configures switch 300 by updating TCAM 305.

In some embodiments, an IDPS unit is adapted to determine a cyber threat is no longer present and reconfigure a switch according to a post cyber threat state. For example, when IDPS 200 determines or identifies an attack is no longer in progress (e.g., malicious software was removed form a compromised ECU), IDPS 200 may reconfigure switch 300, e.g., to remove blocking of messages from the previously compromised ECU.

In some embodiments, an IDPS unit is adapted to generate and update a model of network traffic over the in-vehicle network and identify a cyber threat based on relating network messages received from the switch to the model.

Generally, a model included in and/or used and maintained by, some embodiments, e.g., model 147, may include, or may represent, any attributes of content, metadata or payload of messages. For example, model 147 may include representations, descriptions, qualities, characteristics, properties, features, traits or any other relevant aspects of content that may be included in, or carried by, messages communicated over an in-vehicle network. A model (e.g., model 147) may be used in order to define, represent, and determine compliance with, an expected characteristics or behavior. For example, an expected behavior or characteristics of a specific message type, an expected behavior or characteristics of messages coming from a specific ECU, or an expected behavior or characteristics of a flow (e.g., a set or sequence of messages), expressed in words, may be: "a difference between first and second values (e.g., included in first and second messages) is less than 5" or "the rate of change of a value across two or more messages is less than 3", "the rate of change of a value in a ten seconds time window is less than 5" or "in a specific context, the value of a signal in messages is constant" or "following a specific event, the value of a specific signal is 3".

For example, the exemplary behavior (or expected behavior) or characteristics of a message provided in words above may be defined, represented, or be included, in a model using a set of values in an entry of, or for, a specific message group, type or category. For example, messages may be identified, grouped, identified or characterized according to an IP and port combination such that an embodiment can associate a specific behavior and/or apply specific rules to a specific group or category of messages. For example, based on an IP address and port, all messages sent by a specific ECU and/or to a specific ECU may be grouped or categorized (e.g., as related to a specific flow) and the grouped or categorized messages may be analyzed or processed according to rules or criteria that are specific to the group or category. An expected behavior or characteristics of a message may refer to the behavior of a group of messages having a common message type, message ID, description, etc. Accordingly, since a model may define and/or represent an expected behavior or characteristics, a model may be used, by IDPS 200, in order to determine compliance with an expected behavior or characteristics. A model may include thresholds that may be used in order to identify anomalies or cyber threats or cyber-attacks as described herein. Noncompliance with a model may be identified as a cyber-threat. For example, if IDPS 200 identifies noncompliance of messages with a model then IDPS 200 may determine that one or more ECUs have been compromised.

IDPS 200 may periodically, repeatedly or continuously update model 147, for example, based on attributes, behavior or characteristics of messages received as described, IDPS 200 may update model 147. Accordingly, model 147 may be dynamically updated and an embodiment may maintain a model that is adjusted according to changing aspects. For example, an embodiment may learn and record (in model 147) the behavior and characteristics of an in-vehicle network and connected components and thus, a deviation from a normal or characterized behavior can be readily identified as described.

Model 147 may include definitions, characteristics or any other values related to any relevant aspect. For example, model 147 may include definitions, characteristics related to a network specification, a protocol and/or automotive related aspects. Otherwise described, model 147 may include one or more of: a network specification enforcement layer, a protocol protection layer, a network protection layer and an automotive application protection layer. For example, a network specification enforcement layer may include definitions and logic related to a specification of the in-vehicle network, e.g., maximal size of packets, minimal time interval between packets and so on. An embodiment, e.g., a network specification enforcement layer in IDPS 200 may identify cyber threats based on deviations from a network specification. For example, malicious software installed in an ECU may cause the ECU to send messages that are not in accordance with, do not adhere to, or that deviate from, the network specification and, by identifying such deviation, IDPS 200 may identify a cyber threat or a compromised ECU.

In another example, an embodiment may identify cyber threats based on a deviation from a protocol specification.

For example, a protocol protection layer in IDPS 200 may identify a cyber threat based on deviation from a protocol. For example, a protocol may dictate a specific sequence of messages (e.g., the TCP 3-way handshake) and a protocol protection layer in IDPS 200 may examine messages' flows and identify a cyber threat based on identifying a deviation from the specific sequence. For example, malicious software in a compromised ECU that may not be aware of a specific protocol to be adhered to may send messages that cause a deviation from the protocol, e.g., the malicious software may start sending messages before a TCP 3-way handshake sequence is complete, IDPS 200 may identify such deviation and may determine that the deviation is related to a cyber threat as described. An automotive application protection layer in IDPS 200 may identify any suspicious events related to applications or components in a vehicle, e.g., the behavior of components in a vehicle may be known to, and predictable by, IDPS 200, e.g., the temperature sensor in the engine is expected to report a low temperature right after the engine is started and the temperature is expected to rise at a known rate. This behavior may be recorded in model 147 and thus, a deviation from this behavior, e.g., caused malicious software that sends messages disguised as coming from the temperature sensor, may be detected by IDPS 200.

In some embodiments, a sensor connected to an in-vehicle network is adapted to identify events related to at least one of: the in-vehicle network, the vehicle and units connected to the in-vehicle network. In some embodiments, the sensor is further adapted to report identified events to an IDPS and the IDPS may identify a cyber threat based on a report received from the sensor. For example, sensors 315 may be included or integrated in various central locations in an in-vehicle network (e.g., in switch 300 and/or ECU 310 as shown in FIG. 3, virtual switches, domain controllers, gateways, routers and the like), may send network events related to any aspect, e.g., a new MAC address appeared on a switch leg, a new IP address in the system, a new socket opened, a new service offered or registered, and so on. IDPS 200 may use reports received from one or more of sensors 315 to generate, build or update a current network model. It will be understood that sensors 315 may be placed or located anywhere in a system, e.g., a sensor 315 may be included in an ECU or switch or it may be connected to an in-vehicle network and act as a node on the in-vehicle network.

IDPS 200 may compare a current or actual model created and updated as described to a desired, e.g., a predefined model. IDPS 200 may, by comparing a current model to a desired or predefined model, identify divergence from the desired or predefined model as an anomaly that may indicate a cyber threat. IDPS 200 may report any findings, for example, a divergence from a desired state or model of an in-vehicle network may be reported, by IDPS 200. For example, IDPS may send an electronic mail (e-mail) or other electronic message to a predefined list of recipients, may send a message using any platform known in the art or IDPS may present a message or warning to the driver, e.g., using an infotainment system. Since typically, characteristics of an in-vehicle network are generally stable and do not change much over time, by learning, defining and recording a model of the in-vehicle network and using the model to identify cyber threats based on a deviation from the model is an efficient way of identifying cyber threats.

Accordingly, and as described, in some embodiments, an IDPS unit (e.g., IDPS 200) generates and updates a model of network traffic over the in-vehicle network (e.g., network traffic over in-vehicle network 316) based on information received from a sensor (e.g., one of sensors 315) and uses the model to identify a cyber threat.

As described, in some embodiments, a system for securing an in-vehicle network in a vehicle includes a switch connected to at least two portions of the in-vehicle network (e.g., switch 300), and the system includes an IDPS unit (e.g., IDPS 200) adapted to identify a cyber threat based on messages received from the in-vehicle network. In some embodiments, the IDPS unit dynamically and/or automatically configures the switch according to the cyber threat. For example, IDPS 200 may dynamically and/or automatically configure switch 300 when a cyber threat is identified and may further dynamically and/or automatically reconfigure switch 300 when the threat is no longer present. Accordingly, an embodiment may dynamically and/or automatically configure and reconfigure elements according to changing threats and/or conditions.

Figure 10:
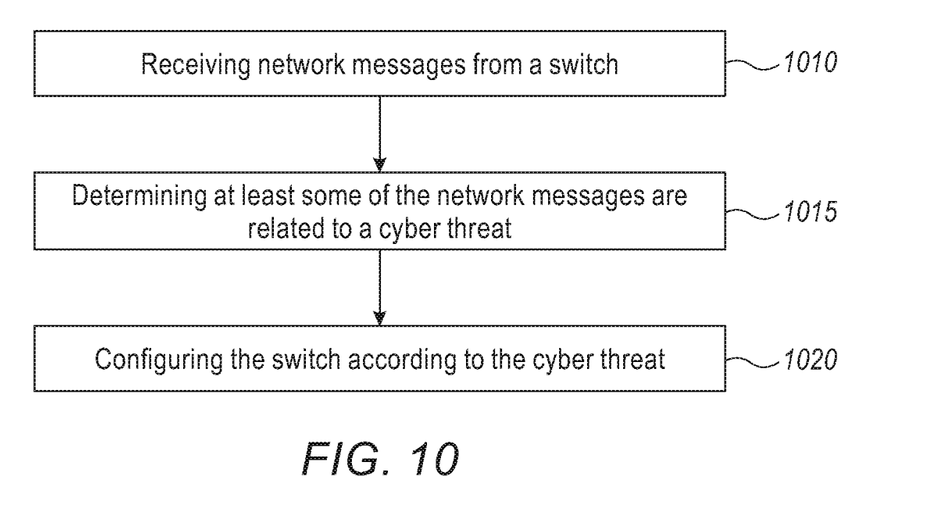
FIG. 10 shows a flowchart of a method according to illustrative embodiments of the present invention.

Reference is made to FIG. 10, which is a flowchart of a method according to illustrative embodiments of the present invention. As shown by block 1010, network messages may be received from a switch. For example, IDPS 200 receives messages from switch 300 as described. As shown by block 1015, an embodiment may determine at least some of the received messages are related to a cyber threat. For example, IDPS 200 determines some of the message received from switch 300 are related to a cyber threat. For example, a cyber threat is an event or situation whereby an ECU is compromised, e.g., controlled by malicious software installed thereon by a hacker. As shown by block 1020, a switch may be configured according to the cyber threat. For example, having identified a cyber threat related to an ECU being controlled by malicious software, IDPS 200 configures switch 300 to drop messages coming from the ECU.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention. Various embodiments have been presented. Each of these embodiments may of course include features from other embodiments presented, and embodiments not specifically described may include various features described herein.

The invention claimed is:

1. A system for securing an in-vehicle network in a vehicle, the system comprising:
   a switch connected to at least two segments of the in-vehicle network; and
   an intrusion detection and prevention system (IDPS) unit connected to the switch;
   wherein the IDPS unit is adapted to:
   receive network messages from the switch,
   determine, according to a rule, at least some of the network messages are related to a cyber threat, and
   automatically, configure the switch according to the cyber threat by modifying configuration information in an internal memory of the switch.

2. The system of claim 1, wherein the IDPS unit receives network messages from the switch over an internal bus included in the switch.

3. The system of claim 1,
   wherein the IDPS unit is adapted to perform deep packet analysis of the network messages, and
   wherein said determining at least some of the network messages are related to a cyber threat is based on a state and context of at least one of: the vehicle, the in-vehicle network and at least one component connected to the in-vehicle network.

4. The system of claim 1, wherein the switch includes a ternary content-addressable memory (TCAM) table and wherein configuring the switch includes updating information in the TCAM table.

5. The system of claim 1, wherein the IDPS unit is adapted to:
determine the cyber threat is no longer present; and
reconfigure the switch according to a post cyber threat state.

6. The system of claim 1, wherein:
the IDPS is adapted to generate and update a model of network traffic over the in-vehicle network; and
identify a cyber threat based on relating network messages received from the switch to the model.

7. The system of claim 1, further comprising at least one sensor adapted to identify events related to at least one of: the in-vehicle network, the vehicle and at least one unit connected to the in-vehicle network,
wherein the IDPS unit identifies a cyber threat based on a report received from the sensor.

8. The system of claim 7, wherein the IDPS unit:
generates and updates a model of network traffic over the in-vehicle network based on information received from the sensor; and
uses the model to identify a cyber threat.

9. A system for securing an in-vehicle network in a vehicle, the system comprising:
a switch connected to at least two portions of the in-vehicle network; and
an intrusion detection and prevention system (IDPS) connected to the switch;
wherein the IDPS unit is adapted to:
identify, based on a rule, a cyber threat based on messages received from the in-vehicle network, and
automatically configure the switch according to the cyber threat by modifying configuration information in an internal memory of the switch.

10. The system of claim 9, wherein configuring the switch includes updating a ternary content-addressable memory (TCAM) table in the switch.

11. The system of claim 9, further comprising at least one sensor adapted to report events related to at least one of: the in-vehicle network, the vehicle and at least one unit connected to the in-vehicle network,
wherein IDPS unit is adapted to identify the cyber threat based on reports received from the sensor.

12. The system of claim 9, wherein the IDPS unit is adapted to:
generate and update a model of network traffic over the in-vehicle network; and
determine, based on the model, at least one of the network messages is related to a cyber threat.

13. The system of claim 12, wherein the model includes at least one of: a network specification enforcement layer, a protocol protection layer, a network protection layer and an automotive application protection layer.

14. The system of claim 12, wherein the IDPS unit is adapted to update the model based on a report from the at least one sensor.

15. A method of securing an in-vehicle network in a vehicle, the method comprising:
receiving, by an intrusion detection and prevention system (IDPS) unit connected to a switch, network messages from the switch, wherein the switch is connected to at least two segments of the in-vehicle network;
determining, by the IDPS unit and according to a rule, at least some of the network messages are related to a cyber threat, and
automatically configuring the switch, by the IDPS unit, according to the cyber threat, wherein configuring the switch includes modifying, by the IDPS unit, configuration information in an internal memory of the switch.

16. The method of claim 15, wherein the IDPS unit receives network messages from the switch over an internal bus included in the switch.

17. The method of claim 15, further comprising:
performing, by the IDPS unit, deep packet analysis of the network messages; and
determining at least some of the network messages are related to a cyber threat based on a state and context of at least one of: the vehicle, the in-vehicle network and at least one component connected to the in-vehicle network.

18. The method of claim 15, wherein the switch includes a ternary content-addressable memory (TCAM) table and wherein configuring the switch includes updating information in the TCAM table.

19. The method of claim 15, further comprising:
determining, by the IDPS unit, the cyber threat is no longer present; and
reconfiguring the switch, by the IDPS unit, according to a post cyber threat state.

20. The method of claim 15, further comprising identifying the cyber threat based on relating network messages received from the switch to a model.

* * * * *